(12) United States Patent
Yu et al.

(10) Patent No.: US 12,443,769 B2
(45) Date of Patent: Oct. 14, 2025

(54) METHOD FOR SUPPORT STRUCTURE OF LARGE-SCALE VIBRATIONAL EXCITATION PLATFORM

(71) Applicant: Harbin Institute of Technology, Harbin (CN)

(72) Inventors: Chenglong Yu, Harbin (CN); Tianyi Li, Harbin (CN); Bin Li, Harbin (CN); DeHai Li, Harbin (CN); Bo Zhao, Harbin (CN)

(73) Assignee: Harbin Institute of Technology, Harbin (CN)

( * ) Notice: Subject to any disclaimer, the term of this patent is extended or adjusted under 35 U.S.C. 154(b) by 0 days.

(21) Appl. No.: 18/731,449

(22) Filed: Jun. 3, 2024

(65) Prior Publication Data
US 2024/0403498 A1  Dec. 5, 2024

(30) Foreign Application Priority Data
Jun. 5, 2023  (CN) ............ 202310652731.3

(51) Int. Cl.
*G01M 7/02*  (2006.01)
*G06F 30/10*  (2020.01)
*G06F 30/23*  (2020.01)

(52) U.S. Cl.
CPC ........... *G06F 30/10* (2020.01); *G01M 7/02* (2013.01); *G06F 30/23* (2020.01)

(58) Field of Classification Search
CPC ...... G06F 30/10; G06F 2111/04; G01M 7/02; F16M 5/00; F16F 9/306
See application file for complete search history.

(56) References Cited

U.S. PATENT DOCUMENTS 4,954,375 A * 9/1990 Sattinger .............. F16M 5/00
52/309.1

* cited by examiner

Primary Examiner — Lee A Holly
(74) Attorney, Agent, or Firm — IPro, PLLC

(57) ABSTRACT

Provided is a design method for a support structure of a large-scale vibrational excitation platform. The present invention designs a dimension of a support structure matching a dimension of the vibrational excitation platform, selects appropriate materials to guarantee structural stiffness, performs simulation and verification of finite elements to verify a natural frequency and stress deformation of the support structure, breaks down the support structure to facilitate processing, transportation and assembly, and optimizes structural parameters to enhance stability and stiffness of the support structure. The support structure designed using the design method in the present invention features strong stability, simple structure, high natural frequency and easy to mount. The support structure is assembled by means of welding and threaded connections, and is reinforced with reinforcement plates at important parts, such that structural stiffness and strength of the support structure are guaranteed.

6 Claims, 3 Drawing Sheets

METHOD FOR SUPPORT STRUCTURE OF LARGE-SCALE VIBRATIONAL EXCITATION PLATFORM

TECHNICAL FIELD

The present invention belongs to the technical field of large-scale platform support connection, and particularly relates to a design method for a support structure of a large-scale vibrational excitation platform.

BACKGROUND

As one of important components of a vibrational excitation platform, a support structure provides necessary connection and stiffness for the vibrational excitation platform, and constitutes an important guarantee for normal operation of the platform. For a large-scale vibrational excitation device, main functions of the support structure are:
1. serving as a mounting support structure for an actuator and providing a leveling device;
2. serving as a support structure for air springs; and
3. elevating the platform to provide enough space at the bottom for maintenance and replacement of the equipment.

Since the platform will produce strong vibrations, it is necessary to ensure that the support structure has a greatly high frequency (or stiffness) to avoid resonance of the platform; as a mounting structure of the actuator, it is also necessary to ensure that the support structure undergoes the minimum deformation under the action of reaction force when the actuator exerts force; in addition, as the support structure of the air springs, the support structure needs to support the entire platform and must have robust strength in a vertical direction. In order to meet the aforesaid usage requirements, the present invention designs a support structure.

SUMMARY

In order to solve the problems in the prior art, the present invention is to provide a design method for a support structure of a large-scale vibrational excitation platform, and particularly relates to a design method of a support connection structure meeting natural frequency requirements of large-scale vibrational excitation equipment.

The present invention is implemented by means of the following technical solution: the present invention provides a design method for a support structure of a large-scale vibrational excitation platform, including the following steps:
step 1. designing a framework dimension: preliminarily determining a dimension of the support framework according to a dimension of the vibrational excitation platform, and sketching out a preliminary model of the support structure;
step 2. selecting materials: considering application requirements, processing time and other factors, and selecting and optimizing materials for the framework in combination with subsequent simulation results;
step 3. breaking down framework structure: breaking down the framework into a plurality of components based on a model of the support structure, and determining connection methods among all components;
step 4. simulating and verifying finite elements: analyzing a local mode and deformation due to force of motor backup plates, as well as an overall mode of the entire framework according to the usage conditions, and obtaining simulation results;
step 5. optimizing structural parameters: verifying whether the support framework designed above meets the usage requirements based on the results obtained in the step 4; optimizing structures and dimensions of the weak parts when the verification reveals that the support framework fails to meet the same; going back to the step 2 when it is necessary to change the materials, and then moving on to the step 4 to perform the simulation and verification of finite elements; and directly go to the step 2 when the materials are qualified, until the simulation results meet the usage requirements; and
step 6. determining a solution: when the step 4 is successfully completed, determining a final support framework structure in combination with the results of the step 3, and sorting out models of all parts and simulation files to form a final solution.

Further, in the step 1, enough space is reserved based on the dimension of the vibrational excitation platform to guarantee the maximum stroke of an actuator, a proper bottom space is reserved to guarantee normal maintenance work, and a dimension of the support framework is preliminarily determined; specifically, a dimension for mounting the vibrational excitation platform in the middle of the support framework is 4 m*2.44 m, and a height of the space for maintenance work reserved at the bottom is achieved by elevating air springs, with a specific elevated height of 960 mm.

Further, in the step 2, considering the application requirements, processing time and other factors, basic materials capable of being used for the support framework can be square steels or I-beam steel; first, a material is roughly selected, the preliminary model of the support structure is sketched out, and materials are further selected according to the simulation results of finite elements.

Further, in the step 3, considering actual usage requirements and mounting conditions, the support framework is divided into seven major assemblies and other small components, where the seven major assemblies include two horizontal beams, two longitudinal beams and three support legs, and the other small components include the support legs made of I-beam steels, the motor backup plates, mounting adjustment plates, limiting devices and reinforcement plates; and all the components are connected by means of welding and are assembled by means of threaded connection, and the reinforcement plates are used in important parts for reinforcement.

Further, assembly should be performed in the following order to ensure guarantee symmetry of actuator output:
(1) checking whether the ground is flat, with no obvious ridges or depressions;
(2) mounting the three supporting legs at the bottom, taking the supporting leg in the middle as a benchmark and aligning the supporting legs on both sides with it, so as to guarantee parallelism between an upper plane and sides;
(3) mounting the horizontal beams or the longitudinal beams; and assuming that the horizontal beam on one side is mounted at first, the horizontal beam on the one side is taken as a benchmark to mount the horizontal beam on the other side, so as to guarantee parallelism of the two horizontal beams and flatness of the upper plane formed by the two horizontal beams;
(4) mounting the remaining longitudinal or horizontal beams; and upon completion of mounting of the two horizontal beams, mounting the two longitudinal beams by taking the horizontal beam on one side as a benchmark, so as to guarantee perpendicularity between the two longitudinal beams and the horizontal beam on one side, as well as flatness of the upper plane;

(5) mounting the motor backup plates and the mounting adjustment plates by taking the horizontal beam on one side as a benchmark, so as to guarantee positional accuracy of each motor backup plate; and (6) mounting the remaining support legs made of I-beam steels and the limiting devices, and giving top priority to guarantee stability of the mounting.

Further, in the step 4, after final optimization of parameters, a first-order natural frequency of the motor backup plates is 366.28 Hz, the maximum deformation under the maximum stress is $3.34 \times 10^{-6}$ m, and the maximum Mises stress is 4.17 MPa, all of which meet the usage requirements, with its constraint conditions as: fixed constraints are imposed on a total of 18 contact surfaces of the support legs, including 14 contact surfaces between the support legs at the bottom of the support frame and the ground, and 4 contact surfaces between the support legs on the sides thereof and walls; and a first-order natural frequency of the support framework is 150.45 Hz under fixed constraints, meeting the usage requirements, with its constraint conditions as: the maximum output of the motor is imposed on bolt surfaces connecting the motor backup plates and the mounting adjustment plates, and fixed constraints are imposed on the ground of the motor backup plates.

The present invention has the following beneficial effects:

The present invention designs a support connection structure for a large-scale vibrational excitation platform that meets its usage requirement, especially the natural frequency requirements, thereby ensuring stable and normal operation of the structure, and allowing for convenient maintenance and replacement of components at any time. The present invention designs the dimension of support structure matching the dimension of the vibrational excitation platform, selects appropriate materials to guarantee the structural stiffness, performs simulation and verification of finite elements to verify the natural frequency and stress deformation of the support structure, breaks down the support structure to facilitate processing, transportation and assembly, and optimizes the structural parameters to enhance stability and stiffness of the support structure. The support structure designed using the design method in the present invention features strong stability, simple structure, high natural frequency and easy to mount. The support structure is assembled by means of welding and threaded connections, and is reinforced with reinforcement plates at important parts, ensuring structural stiffness and strength of the support structure.

DETAILED DESCRIPTION

Figure 1:
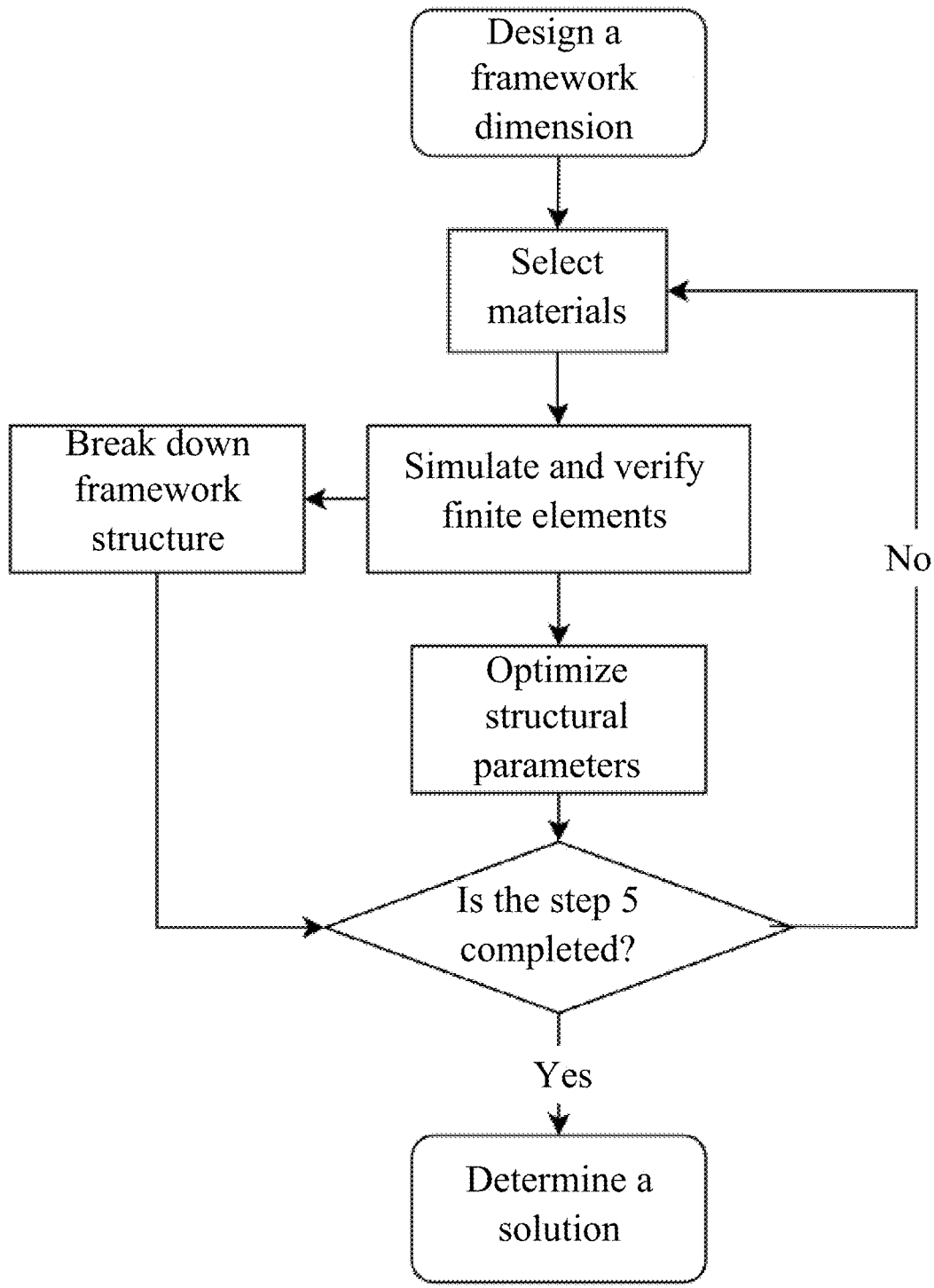
FIG. 1 is a design flow chart for a support structure of a large-scale vibrational excitation platform.

The technical solutions of embodiments of the present invention will be described below clearly and comprehensively in conjunction with the accompanying drawings of the embodiments of the present invention. Apparently, the embodiments described are merely some embodiments rather than all embodiments of the present invention. All the other embodiments obtained by those of ordinary skill in the art based on the embodiments in the present invention without creative efforts shall fall within the protection scope of the present invention.

The present invention aims to design a support connection framework capable of meeting the usage requirements for a marble vibrational excitation platform with a size of 4 m*3 m, and the use demands requirements:

(1) sufficient stiffness and strength to ensure minimal deformation of the framework when motors exert force;

(2) overall and local first-order natural frequencies are not lower than 141.4 Hz; and (3) a necessary position adjustment device.

With reference to FIGS. 1-5, the present invention provides a design method for a support structure of a large-scale vibrational excitation platform, the method includes six steps: designing a framework dimension, selecting materials, simulating and verifying finite elements, breaking down framework structure, optimizing structural parameters and determining a solution, of which steps 2, 4 and 5 are repeated in the design process. Specific design steps are as follows:

step 1. designing a framework dimension: preliminarily determining a dimension of the support framework according to a dimension of the vibrational excitation platform, and sketching out a preliminary model of the support structure;

step 2. selecting materials: considering application requirements, processing time and other factors, and selecting and optimizing materials for the framework in combination with subsequent simulation results;

step 3. breaking down framework structure: breaking down the framework into a plurality of components based on a model of the support structure, and determining connection methods among all components;

step 4. simulating and verifying finite elements: analyzing a local mode and deformation due to force of motor backup plates, as well as an overall mode of the entire framework according to the usage conditions, and obtaining simulation results;

step 5. optimizing structural parameters: verifying whether the support framework designed above meets the usage requirements based on the results obtained in the step 4; optimizing structures and dimensions of the weak parts when the verification reveals that the support framework fails to meet the same; going back to the step 2 when it is necessary to change the materials, and then moving on to the step 4 to perform the simulation and verification of finite elements; and directly go to the step 2 when the materials are qualified, until the simulation results meet the usage requirements; and step 6. determining a solution: when the step 4 is successfully completed, determining a final support framework structure in combination with the results of the step 3, and sorting out models of all parts and simulation files to form a final solution.

In the step 1, enough space is reserved based on the dimension of the vibrational excitation platform to guarantee the maximum stroke of an actuator, a proper bottom space is reserved to guarantee normal maintenance work, and a dimension of the support framework is preliminarily determined. Specifically, a dimension for mounting the vibrational excitation platform in the middle of the support framework is 4 m*2.44 m, and a height of the space for maintenance work reserved at the bottom is achieved by elevating air springs, with a specific elevated height of 960 mm.

Figure 2:
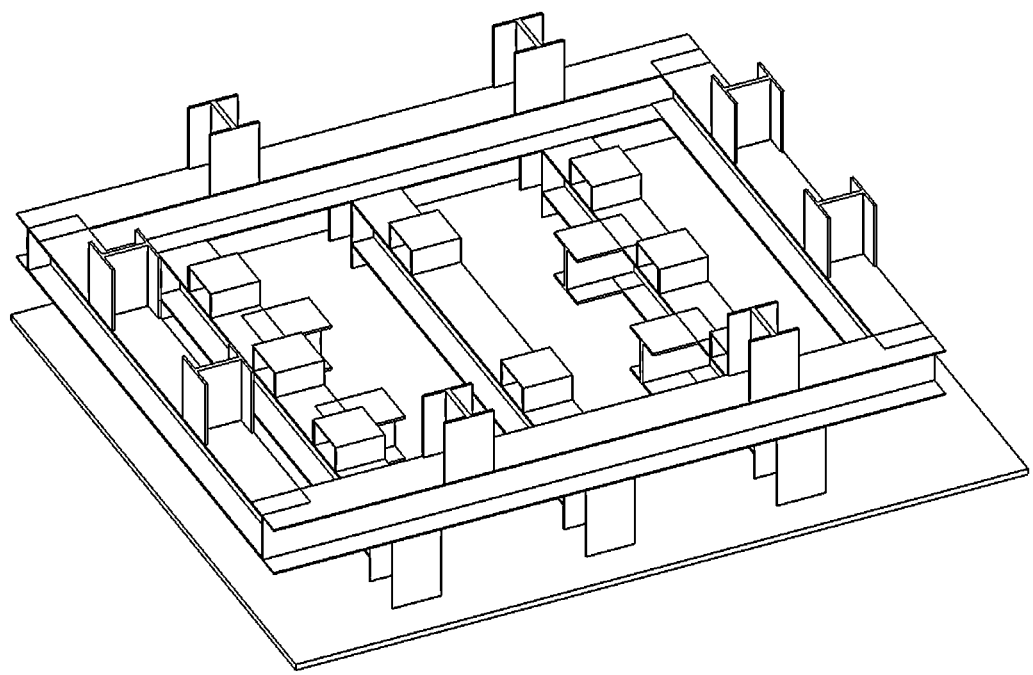
FIG. 2 is a schematic diagram of dimension design results of a support framework.
Figure 3A:
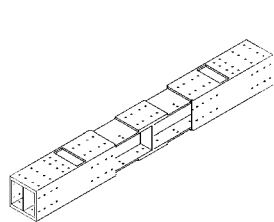
FIG. 3A-FIG. 3H are schematic diagrams of a model of each assembly and component, including (a) horizontal beam; (b) longitudinal beam; (c) support leg; (d) support leg made of I-beam steel; (e) motor backup plate; (f) mounting adjustment plate 1; (g) mounting adjustment plate 2; and (h) reinforcement plate.
Figure 3B:
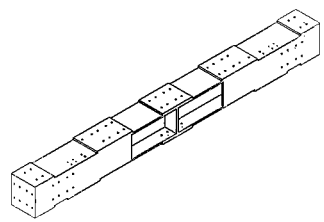
Figure 3C:
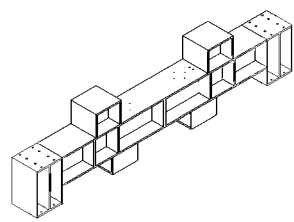
Figure 3D:
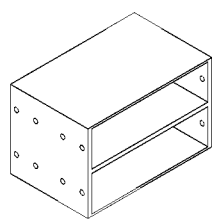
Figure 3E:
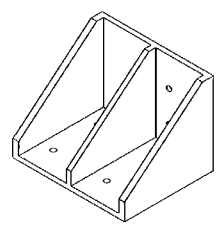
Figure 3F:
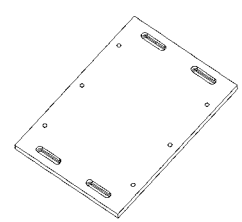
Figure 3G:
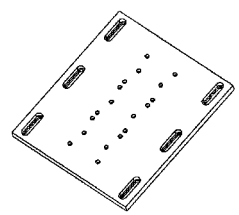
Figure 3H:
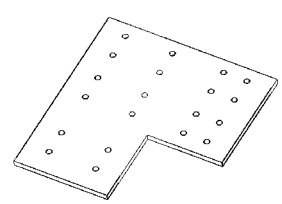

In the step 2, considering the application requirements, processing time and other factors, basic materials capable of being used for the support framework can be square steels or I-beam steel; first, a material is roughly selected, the preliminary model of the support structure is sketched out, and materials are further selected according to the simulation results of finite elements. Specifically, after the simulation results are analyzed, I-beams with a cross-section of 400 mm*400 mm are finally selected as materials for a main structure and other parts of the support framework, and the I-beam steels have the advantages of good cost-effectiveness, high structural strength, easy processing and robust bending resistance, thereby providing better stability. The main structure of the support framework is welded with steel plates are welded on both sides of the I-beam steels to increase the overall strength of the main structure. The preliminary designed framework is shown in FIG. 2.

Figure 4:
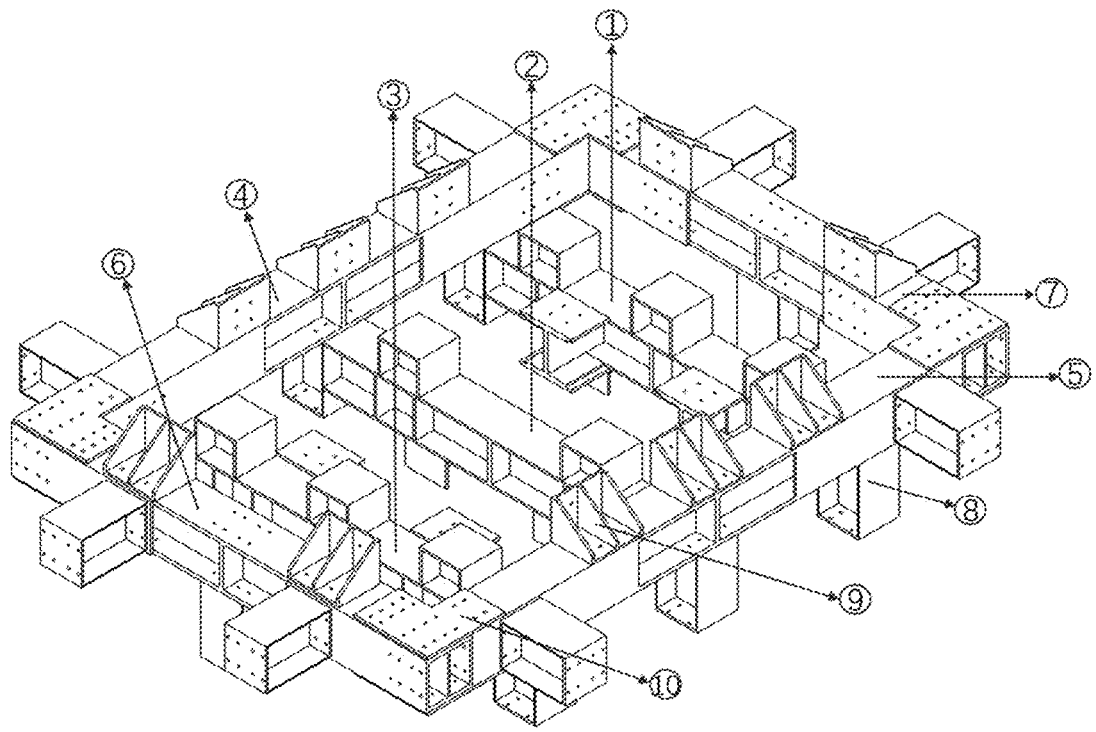
FIG. 4 is a schematic diagram of a model of a final solution, where the reference numerals are: 1, 2 and 3. three support legs; 4. horizontal beam on one side; 5. horizontal beam on the other side; 6. longitudinal beam on one side; 7. longitudinal beam on the other side; 8. support leg made of I-beam steel; 9. motor backup plate; and 10. reinforcement plate.

In the step 3, by considering mounting conditions, structural strength, convenience of mounting, processing difficulty and other factors, the framework is broken down into a plurality of components based on the rough model of the support framework, connection methods among all components are determined, and reinforcement plates are added at connections of the main structure, if necessary, for enhancing the stability. Considering actual usage requirements and mounting conditions, the support framework is divided into seven major assemblies and other small components, where the seven major assemblies include two horizontal beams, two longitudinal beams and three support legs, all of which are assemblies with extremely large size and great weight, and the other small components include the support legs made of I-beam steels, the motor backup plates, mounting adjustment plates, limiting devices and reinforcement plates; and all the components are connected by means of welding and are assembled by means of threaded connection, and the reinforcement plates are used in important parts for reinforcement. All assemblies and components are shown in FIG. 3A-FIG. 3H. An overall assembly diagram of the support structure is shown in FIG. 4.

Since the symmetry of the actuator (motor) output during vibrational excitation of a vibrational excitation has a significant impact on decoupling control, it is necessary to ensure high symmetry when assembling the framework. Under the condition of guaranteeing the machining precision, assembly should be performed in the following order to ensure guarantee symmetry of actuator output:

(1) checking whether the ground is flat, with no obvious ridges or depressions;

(2) mounting the three supporting legs at the bottom, taking the supporting leg in the middle as a benchmark and aligning the supporting legs on both sides with it, so as to guarantee parallelism between an upper plane and sides;

(3) mounting the horizontal beams or the longitudinal beams; and assuming that the horizontal beam on one side is mounted at first, the horizontal beam on the one side is taken as a benchmark to mount the horizontal beam on the other side, so as to guarantee parallelism of the two horizontal beams and flatness of the upper plane formed by the two horizontal beams;

(4) mounting the remaining longitudinal or horizontal beams; and upon completion of mounting of the two horizontal beams, mounting the two longitudinal beams by taking the horizontal beam on one side as a benchmark, so as to guarantee perpendicularity between the two longitudinal beams and the horizontal beam on one side, as well as flatness of the upper plane;

(5) mounting the motor backup plates and the mounting adjustment plates by taking the horizontal beam on one side as a benchmark, so as to guarantee positional accuracy of each motor backup plate; and (6) mounting the remaining support legs made of I-beam steels and the limiting devices, and giving top priority to guarantee stability of the mounting.

In the step 4, a local mode and deformation due to force of the motor backup plates, as well as an overall mode of the entire framework are analyzed according to the usage conditions, and simulation results are then obtained. Specifically, after final optimization of parameters, a first-order natural frequency of the motor backup plates is 366.28 Hz, the maximum deformation under the maximum stress is $3.34 \times 10{-6}$ m, and the maximum Mises stress is 4.17 MPa, all of which meet the usage requirements, with its constraint conditions as: fixed constraints are imposed on a total of 18 contact surfaces of the support legs, including 14 contact surfaces between the support legs at the bottom of the support frame and the ground, and 4 contact surfaces between the support legs on the sides thereof and walls; and a first-order natural frequency of the support framework is 150.45 Hz under fixed constraints, meeting the usage requirements, with its constraint conditions as: the maximum output of the motor is imposed on bolt surfaces connecting the motor backup plates and the mounting adjustment plates, and fixed constraints are imposed on the ground of the motor backup plates (connections to the horizontal and longitudinal beams of the framework).

In the step 5. efforts are made to verify whether the support framework designed above meets the usage requirements based on the results obtained in the step above; structures and dimensions of the weak parts are optimized when the verification reveals that the support framework fails to meet the same; and the step 4 is repeated again until the simulation results meet the usage requirements. Specifically, for areas with significant deformation identified through the optimization results, operations such as thickening and reinforcing the steel plates, changing directions of the I-beam steels, or replacing the I-beam steels with square steels, are performed to reinforce the structural strength.

Figure 5:
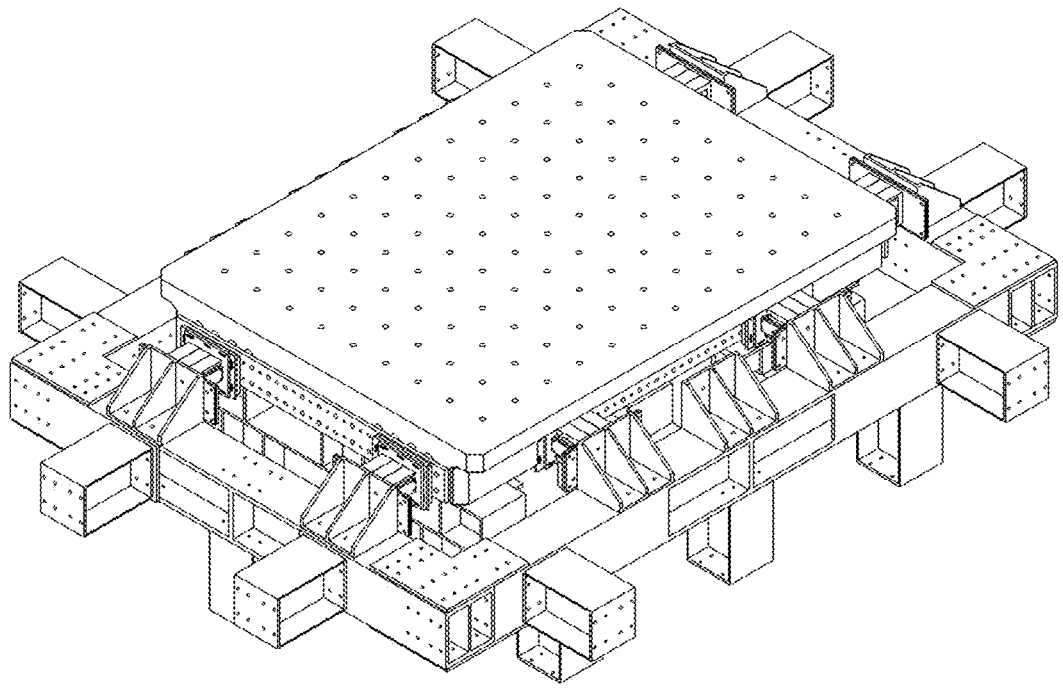
FIG. 5 is a schematic diagram of a model of vibrational excitation equipment.

In the step 6, when the step 4 is successfully completed, a final support framework structure can be determined in combination with the results of the step 3, and models of all parts and simulation files are sorted out to form a final solution. A final model of the support framework model is shown in FIG. 4. Since the mounting adjustment plates are connected to the motors, the mounting adjustment plates are not shown in FIG. 4. FIG. 5 shows a vibrational device composed of a support framework and a vibrational excitation platform.

The above are only preferred embodiments of the present invention, and are not intended to limit the present invention. Although the present invention has been described in detail with reference to the above embodiment, for those skilled in the art, it is still apparent that the technical solutions described in the above embodiment may be modified, or some technical features thereof may be equivalently replaced. Any modification, equivalent replacement, improvement, etc. made within the spirit and principle of the present invention shall fall within the protection scope of the present invention.

What is claimed is:

1. A design method for a support structure of a large-scale vibrational excitation platform, comprising the following steps:
    step 1. designing a framework dimension: preliminarily determining a dimension of a support framework according to a dimension of the vibrational excitation platform, and sketching out a preliminary model of the support structure;
    step 2. selecting materials: considering application requirements, processing time and other factors, and selecting and optimizing materials for the framework in combination with subsequent simulation results;
    step 3. breaking down framework structure: breaking down the framework into a plurality of components based on a model of the support structure, and determining connection methods among all components;
    step 4. simulating and verifying finite elements: analyzing a local mode and deformation due to force of motor backup plates, as well as an overall mode of the entire framework according to usage conditions, and obtaining simulation results;
    step 5. optimizing structural parameters: verifying whether the support framework designed above meets the usage requirements based on the results obtained in the step 4; optimizing structures and dimensions of weak parts when the verification reveals that the support framework fails to meet the same; going back to the step 2 when it is necessary to change the materials, and then moving on to the step 4 to perform simulation and verification of finite elements; and directly go to the step 2 when the materials are qualified, until the simulation results meet the usage requirements; and
    step 6. determining a solution: when the step 4 is successfully completed, determining a final support framework structure in combination with the results of the step 3, and sorting out models of all parts and simulation files to form a final solution.

2. The method according to claim 1, wherein in the step 3, considering actual usage requirements and mounting conditions, the support framework is divided into seven major assemblies and other small components, wherein the seven major assemblies comprise two horizontal beams, two longitudinal beams and three support legs, and the other small components comprise the support legs made of I-beam steels, the motor backup plates, mounting adjustment plates, and reinforcement plates; and all the components are connected by means of welding and are assembled by means of threaded connection, and the reinforcement plates are used for reinforcement.

3. The method according to claim 2, wherein assembly should be performed in the following order to ensure guarantee symmetry of actuator output:

(1) checking whether ground is flat, with no obvious ridges or depressions;
    (2) mounting three supporting legs at the bottom, taking one of the supporting legs in the middle as a benchmark and aligning the supporting legs on both sides with it, so as to guarantee parallelism between an upper plane and sides;
    (3) mounting the horizontal beams or the longitudinal beams; and assuming that the horizontal beam on one side is mounted at first, the horizontal beam on the one side is taken as a benchmark to mount the horizontal beam on the other side, so as to guarantee parallelism of the two horizontal beams and flatness of the upper plane formed by the two horizontal beams;
    (4) mounting the remaining longitudinal or horizontal beams; and upon completion of mounting of the two horizontal beams, mounting the two longitudinal beams by taking the horizontal beam on one side as a benchmark, so as to guarantee perpendicularity between the two longitudinal beams and the horizontal beam on one side, as well as flatness of the upper plane;
    (5) mounting the motor backup plates and the mounting adjustment plates by taking the horizontal beam on one side as a benchmark, so as to guarantee positional accuracy of each motor backup plate; and
    (6) mounting the remaining support legs made of I-beam steels, and giving top priority to guarantee stability of the mounting.

4. The method according to claim 1, wherein in the step 1, enough space is reserved based on a dimension of the vibrational excitation platform to guarantee a maximum stroke of an actuator, a proper bottom space is reserved to guarantee normal maintenance work, and a dimension of the support framework is preliminarily determined; specifically, a dimension for mounting the vibrational excitation platform in the middle of the support framework is 4 m*2.44 m, and a height of a space for maintenance work reserved at the bottom is achieved by elevating air springs, with a specific elevated height of 960 mm.

5. The method according to claim 1, wherein in the step 2, considering the application requirements, processing time and other factors, basic materials capable of being used for the support framework can be square steels or I-beam steel; first, a material is roughly selected, the preliminary model of the support structure is sketched out, and materials are further selected according to the simulation results.

6. The method according to claim 1, wherein in the step 4, after final optimization of parameters, a first-order natural frequency of the motor backup plates is 366.28 Hz, the maximum deformation under the maximum stress is 3.34× 10−6 m, and the maximum Mises stress is 4.17 MPa, all of which meet the usage requirements, with its constraint conditions as: fixed constraints are imposed on a total of 18 contact surfaces of the support legs, comprising 14 contact surfaces between the support legs at the bottom of the support frame and ground, and 4 contact surfaces between the support legs on the sides thereof and walls; and a first-order natural frequency of the support framework is 150.45 Hz under fixed constraints, meeting the usage requirements, with its constraint conditions as: the maximum output of the motor is imposed on bolt surfaces connecting the motor backup plates and the mounting adjustment plates, and fixed constraints are imposed on ground of the motor backup plates.

* * * * *